(12) United States Patent
McFarland

(10) Patent No.: US 9,123,071 B1
(45) Date of Patent: Sep. 1, 2015

(54) SERVICES FOR USING GROUP PREFERENCES TO IMPROVE ITEM SELECTION DECISIONS

(75) Inventor: Ross W. McFarland, Seattle, WA (US)

(73) Assignee: Amazon Technologies, Inc., Seatle, WA (US)

( * ) Notice: Subject to any disclaimer, the term of this patent is extended or adjusted under 35 U.S.C. 154(b) by 1049 days.

(21) Appl. No.: 11/277,936

(22) Filed: Mar. 29, 2006

Related U.S. Application Data

(60) Provisional application No. 60/743,317, filed on Feb. 17, 2006.

(51) Int. Cl.
*G06Q 30/00* (2012.01)
*G06Q 30/06* (2012.01)

(52) U.S. Cl.
CPC ........ *G06Q 30/0631* (2013.01); *G06Q 30/0633* (2013.01)

(58) Field of Classification Search
CPC .......... G06Q 30/0631; G06Q 30/0633; G06Q 30/0222
USPC ............. 705/343, 347, 27.1, 26.1, 26.7, 26.8, 705/26.81
See application file for complete search history.

(56) References Cited

U.S. PATENT DOCUMENTS

| | | | |
|---|---|---|---|
| 5,583,763 A * | 12/1996 | Atcheson et al. | 707/750 |
| 5,758,257 A | 5/1998 | Herz et al. | |
| 6,041,311 A * | 3/2000 | Chislenko et al. | 705/27 |
| 6,317,722 B1 | 11/2001 | Jacobi et al. | |
| 6,408,437 B1 | 6/2002 | Hendricks et al. | |
| 6,460,036 B1 | 10/2002 | Herz | |
| 6,584,450 B1 | 6/2003 | Hastings et al. | |
| 6,609,106 B1 * | 8/2003 | Robertson | 705/26 |

(Continued)

FOREIGN PATENT DOCUMENTS

| | | | | |
|---|---|---|---|---|
| EP | 265083 A1 * | 4/1988 | .............. | G09F 27/00 |
| EP | 751471 A1 * | 1/1997 | .............. | G09F 17/60 |

(Continued)

OTHER PUBLICATIONS

Jones et al. "IndustryNet: A Model for Commerce on the World Wide Web" Carnegie Mellon University IEEE Expert,Oct. 1995.*

(Continued)

*Primary Examiner* — Taelor Kim
*Assistant Examiner* — Berhanu Mitiku
(74) *Attorney, Agent, or Firm* — Knobbe, Martens, Olson & Bear, LLP

(57) ABSTRACT

Computer services use group preferences, as partially or wholly specified by preference lists of individual members, to identify items well suited for a designated group of users. In one embodiment, items in the movie/video rental queue (one type of preference list) of a first user are prioritized based, at least partly, on the rental queue of a second, affiliated user, to give priority to items corresponding to the collective preferences of both users. Items may also be recommended to the users based on their collective preferences. In a second embodiment, the suggestion lists of multiple members of a book club are used, optionally in combination with other member preference information, to select or recommend book titles for the club. In a third embodiment, the wish lists of two or more affiliated users are used to assist others in purchasing gifts that correspond to their collective preferences.

17 Claims, 15 Drawing Sheets

(56) References Cited

U.S. PATENT DOCUMENTS

| | | | |
|---|---|---|---|
| 6,611,814 B1 | 8/2003 | Lee et al. | |
| 6,925,444 B1 | 8/2005 | McCollom et al. | |
| 6,963,850 B1 | 11/2005 | Bezos et al. | |
| 7,222,085 B2* | 5/2007 | Stack | 705/10 |
| 7,254,552 B2* | 8/2007 | Bezos et al. | 705/26 |
| 7,305,436 B2* | 12/2007 | Willis | 709/204 |
| 7,315,834 B2* | 1/2008 | Martineau et al. | 705/26 |
| 7,319,975 B2* | 1/2008 | Monteverde | 705/14 |
| 7,324,965 B2* | 1/2008 | Martineau et al. | 705/26 |
| 7,346,668 B2* | 3/2008 | Willis | 709/219 |
| 7,356,490 B1* | 4/2008 | Jacobi et al. | 705/27 |
| 7,403,910 B1* | 7/2008 | Hastings et al. | 705/26 |
| 7,590,564 B1* | 9/2009 | Ward et al. | 705/26.1 |
| 7,756,753 B1 | 7/2010 | McFarland | |
| 7,831,548 B1 | 11/2010 | Round et al. | |
| 8,260,656 B1 | 9/2012 | Harbick et al. | |
| 2002/0019763 A1 | 2/2002 | Linden et al. | |
| 2002/0040389 A1* | 4/2002 | Gerba et al. | 709/219 |
| 2002/0154157 A1 | 10/2002 | Sherr et al. | |
| 2002/0198882 A1* | 12/2002 | Linden et al. | 707/10 |
| 2003/0163399 A1 | 8/2003 | Harper et al. | |
| 2003/0177247 A1* | 9/2003 | Dunning et al. | 709/228 |
| 2004/0003096 A1* | 1/2004 | Willis | 709/228 |
| 2004/0064640 A1* | 4/2004 | Dandrea et al. | 711/114 |
| 2004/0162783 A1* | 8/2004 | Gross | 705/51 |
| 2004/0177073 A1 | 9/2004 | Snyder et al. | |
| 2005/0038712 A1* | 2/2005 | Veeneman | 705/26 |
| 2005/0086127 A1* | 4/2005 | Hastings et al. | 705/26 |
| 2005/0091120 A1* | 4/2005 | Auletta | 705/26 |
| 2005/0125309 A1 | 6/2005 | Song | |
| 2005/0222987 A1* | 10/2005 | Vadon | 707/3 |
| 2006/0053449 A1 | 3/2006 | Gutta | |
| 2006/0282304 A1 | 12/2006 | Bedard et al. | |
| 2007/0061222 A1* | 3/2007 | Allocca et al. | 705/26 |
| 2007/0260777 A1* | 11/2007 | Timpe et al. | 710/52 |
| 2008/0040239 A1* | 2/2008 | Jacobi et al. | 705/27 |
| 2008/0040240 A1* | 2/2008 | Covington et al. | 705/27 |
| 2008/0167946 A1* | 7/2008 | Bezos et al. | 705/10 |

FOREIGN PATENT DOCUMENTS

| | | | | |
|---|---|---|---|---|
| EP | 827063 A1 * | 3/1998 | | G06F 3/00 |
| WO | 02/05122 A2 | 1/2002 | | |
| WO | 03005151 A2 | 1/2003 | | |

OTHER PUBLICATIONS

Hiraiwa et al. "Info-Plaza: A Social Information Filtering System for the World-Wide Web" Institute for Social Information Science Fujitsu Laboratories Ltd. 1-9-3 Nakase, Mihama-ku, Chiba-shi, Chiba, 261 Japan IEEE, 1996.*

Lin et al. "Using customer knowledge in designing electronic catalog" Department of Industrial and Information Management, College of Management, National Cheng Kung University, No. 1, Ta-Hsueh Road, Tainan 701, Taiwan, ROC 2006.*

Nichols et al. "Recommendation and Usage in the Digital Library" Lancaster University, Computing Department Cooperative Systems Engineering Group Technical Report Ref: CSEG/2/1997.*

Web page titled "Gift Registry Service," printed from http://www.loystoys.com/loystoys/gift-registry.html on Aug. 15, 2006.

"Just Add People—Collaborative filtering brings human input to information retrieval in the enterprise," Information Week, p. 65, published on Dec. 22, 1997.

U.S. Appl. No. 09/933,277, filed Aug. 20, 2001.

U.S. Appl. No. 11/093,507, filed Mar. 30, 2005.

U.S. Appl. No. 09/852,124, filed May 8, 2001.

Unknown author, "Gifted Solutions Announces the General Release of its New, Fully Integrated E-Commerce Gift Services Engine," Business Wire, Dec. 13, 1999.

"E-Commerce Recommendation Applications," J. Ben Schafer, Joseph A. Konstan, John Riedl, Data Mining and Knowledge Discovery, Boston: Jan. 2001, vol. 5, Issue 1-2, pp. 115-153.

* cited by examiner

SERVICES FOR USING GROUP PREFERENCES TO IMPROVE ITEM SELECTION DECISIONS

RELATED APPLICATIONS

This application claims the benefit of U.S. Provisional Appl. No. 60/743,317 filed Feb. 17, 2006, the disclosure of which is hereby incorporated by reference.

BACKGROUND OF THE INVENTION

1. Field of the Invention

The present invention relates to electronic catalog systems that include functionality for users to create lists of items they wish to rent, obtain as gifts, or otherwise acquire.

2. Description of the Related Art

Many online systems provide services through which users can create personal lists, referred to herein generally as "preference lists," of items they wish to rent, obtain as gifts, purchase, or otherwise obtain. For example, online shopping web sites commonly provide a service through which users can create and post wish lists (also referred to as "gift registry" lists) of items they wish to obtain as gifts. Other users can browse and make gift purchases from these lists. As another example, some DVD rental web sites provide a service through which users can populate personal "rental queues" (another type of preference list) with selected DVD/video titles they wish to rent. Typically, the items at the top of a user's rental queue are automatically removed from the queue and shipped to the user such that some predetermined maximum number of DVDs are rented out to the user at a time.

Many online systems also provide a recommendation service. A recommendation service is a computer-implemented service that recommends items stored or represented in a data repository. The recommendations are customized to particular users based on information known about the users. One common application for recommendation services involves recommending items for purchase, rental, subscription, or some other form of consumption. For example, online merchants commonly provide services for recommending books, compact discs, videos, and other types of items to customers based on the purchase histories, rental histories, item viewing histories, and/or item ratings of the respective users. Recommendation services are also common for recommending web sites, articles, users, music files, and other types of items.

SUMMARY OF THE INVENTION

One problem with existing preference list and recommendation services, such as those described above, is that they commonly fail to take into consideration information about associations between users. For example, a service may fail to consider that two users have the same shipping address, or that these users frequently share the items they acquire. As a result, the functionality provided by these services is sometimes limited.

The present invention comprises computer services for using group preferences, as specified in whole or in part by preference lists created by individual users, to identify items that are well suited for a group of two or more users. The items may, for example, include movie/video titles, book titles, other types of works in physical or digital form, and/or subscriptions. Also disclosed are associated features for facilitating the sharing of items between users.

In a first embodiment of the invention, users of a movie, video or video game rental system that provides user-specific rental queues are provided an option to associate or link their respective rental queues. Once the rental queue of a first user has been associated with the rental queue of a second user (e.g., a friend or family member of the first user), the items listed in the first user's rental queue are prioritized for delivery to the first user such that items corresponding to the preferences of both users are generally given priority over items corresponding only to the preferences of the first user. For instance, an item in the first user's queue may be increased in priority (and thus delivered sooner) if it is in the second user's queue, or is similar to items in the second user's queue. The rental history and/or item ratings profile of the second user, if available, may also be taken into consideration for purposes of evaluating whether the second user would be interested in viewing particular movie/video titles listed in the first user's queue.

In a second embodiment, users of a book club, or another type of club in which users acquire and review like items on a periodic basis, create suggestion lists to suggest particular items for review by the club. A computer system uses these suggestion lists (and optionally other forms of preference information, such as the item purchase histories and/or item ratings profiles of the members) to select particular items that correspond to the collective preferences of the group. The system may also automatically cause the selected items to be sold and shipped to some or all members of the club.

In a third embodiment, users of a system that provides functionality for creating and posting wish lists are provided an option to associate their wish lists with those of other designated users. Once such an association is created between two or more wish lists, the system provides one or more services for assisting other users in identifying gift items that correspond to the collective preferences of these affiliated users. For instance, users who view the wish list of a first user may be notified when items listed thereon are also listed on, or similar to items listed on, the wish list of a second user who is affiliated with the first user. The system may also generate recommendations of additional items that are not on the wish lists of, but correspond to the collective preferences of, two or more affiliated users.

The invention also comprises computer-implemented methods for using the collective preferences of two or more users to make recommendations of items that are appropriate for these users to share. For example, in the context of two or more related users who have wish lists (which may but need not be linked together as described above), a recommendations component may be provided that recommends additional items that are collectively similar or related to the group of items formed by combining these wish lists. These recommendations may be useful to a person wishing to purchase a gift that is intended to be shared by these related users. As another example, in the context of two or more related users that have movie/rental queues, a recommendations component may recommend additional items that are collectively similar to the items listed in these rental queues, and which are thus likely appropriate for the users to watch together. In both of these examples, the purchase histories, rental histories, and/or item rating profiles of the relevant users may be taken into consideration by the recommendations component.

The aforementioned features may be implemented individually or in combination within a web site system, an online services network, an interactive television system, or another type of interactive, multi-user system.

Neither this summary nor the following detailed description purports to define or limit the invention. The invention is defined only by the claims.

BRIEF DESCRIPTION OF THE DRAWINGS

Specific embodiments of the invention will now be described with reference to the following drawings, which are provided by way of example, and not limitation.

DETAILED DESCRIPTION OF SPECIFIC EMBODIMENTS

I. Overview

Figure 1:
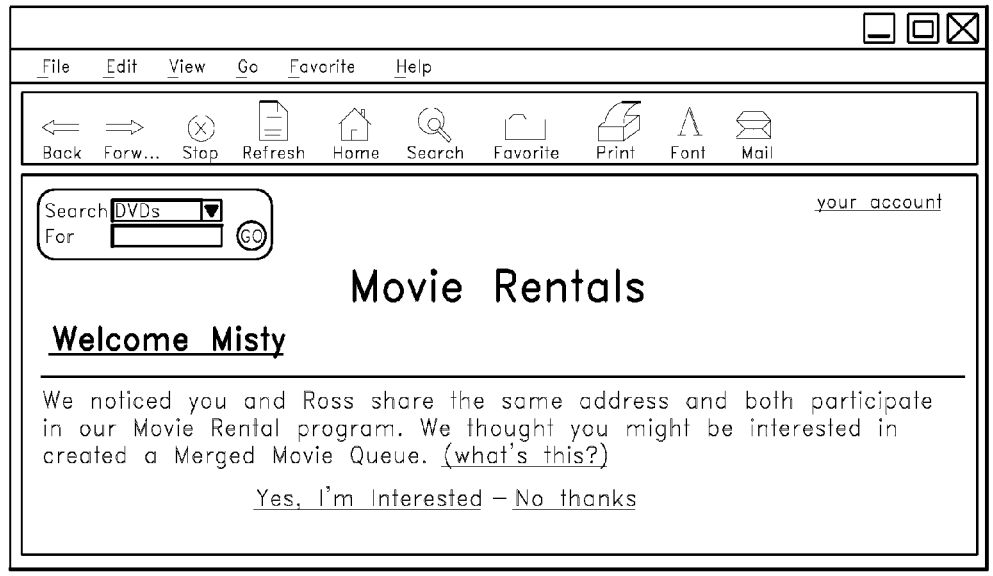
FIG. 1 illustrates an example web page that may be displayed in a rental queue embodiment of the invention to encourage a user to create a merged queue with another user.

The present invention provides computer-implemented methods and services for identifying items that correspond closely to the collective preferences of a group of two or more users. The collective preferences are based or represented, in whole or in part, on preference lists created by individual users. These preference lists may, for example, be in the form of rental queues used for movie/video rentals, wish/gift registry lists of desired gifts, shopping lists for making purchases, or suggestion lists created by members of a club, such as a book club. User preference information in the form of rental histories, purchase histories, and/or item ratings profiles may also be taken into consideration.

The invention may be implemented as part of or in conjunction with an interactive system, such as a web site system, that hosts an electronic catalog of items that are available for purchase and/or rental. The items represented in the electronic catalog may include, for example, physical products that are shipped to customers or picked up at a local store, digital products (e.g., book, music, video, and video game files) that are downloaded or transmitted to customers' computing devices or set-top boxes, tickets for travel or events, services provided to customers, or any combination thereof. The catalog may contain only the offerings of a single merchant, or may include the offerings of many different merchants and/or online sellers.

Four particular embodiments of the invention are described below. The first embodiment involves movie/video rental queues, the second involves suggestion lists created by members of a book club, the third involves wish lists, and the fourth involves a "movie night" feature. As will be apparent, the various features of the invention can also be used with other types of preference lists, such as shopping lists used to make initial or recurring purchases of items, and can be used with other types of items.

In each of the four embodiments, the system may optionally provide functionality for users to interactively rate individual items represented in the catalog, such as on a scale of 1 to 5. If a user opts to rate one or more items, the rating or ratings supplied by the user are referred to herein as the user's "item ratings profile."

II. Rental Queue Embodiment (FIGS. 1-5)

A first embodiment of the invention will now be described with reference to FIGS. 1-5. This first embodiment is applicable to any type of interactive system that provides functionality for users to create personal "queues." In the illustrated embodiment, the queues are rental queues used by an associated business entity to control the delivery of particular rental items to particular users. In other embodiments the queues may, for example, be item delivery queues used for peer-to-peer sharing. In the particular example shown in the drawings, the items are movie titles in DVD format, and are shipped to and returned by users via mail. The items may, however, include other types of items, such as video game titles, book titles and music titles in various formats, including digital formats in which the items are delivered to users electronically over a network. Where the rental items are movie/video titles transmitted in digital form, an appropriate mechanism may be provided to limit the use of the items by the user; for example, a digital video recorder box may be used which effectively erases the movie/video title after a predetermined amount of time, or after the title has been viewed a predetermined number of times.

As is conventional in the context of online DVD rental systems, the system in this first embodiment provides functionality for each user/subscriber to browse an electronic catalog of movie titles, and to add particular movie titles to a personal rental queue. The user can also reorder the items in the rental queue. Ordinarily, the items are mailed/rented out to the user in the order in which they are listed in the queue, such that no more than a predetermined number, such as 1, 2 or 3 movie titles (typically depending upon the associated rental agreement type), are checked out to the user at a time. Thus, for example, when the user returns a particular DVD, the next one on the user's rental queue list is mailed out. The rental methods described in U.S. Pat. No. 6,584,450, the disclosure of which is hereby incorporated by reference, may optionally be used for this purpose.

In accordance with one aspect of the invention, the system in this embodiment also provides functionality for users to explicitly or implicitly associate their respective rental queues with the rental queues of one or more other users, such as friends and/or family members. Once such an association has been created, the system varies the conventional delivery process such that the rental queues (and possibly other preference information) of two or more affiliated users are used in combination to select items to send/rent out to these users. As discussed below, the system may also provide one or more features for assisting the affiliated users in sharing in the viewing of certain items.

For instance, if the rental queues of users A and B are associated, and both rental queues include a particular movie title, this movie title may be given priority over movie titles listed higher up on the rental queues. In addition, the system may provide one more mechanisms for assisting users A and B in sharing in the viewing of this movie title. For instance, the system may select the movie title for delivery to user A, and if users A and B do not share a common delivery/residence address, send user B an email message indicating that this movie title has been sent to user A. This email may also provide a link, button, or other control for user B to request that this movie title be removed from user B's rental queue. If users A and B share the same delivery address, a single DVD copy of movie title may be mailed to that address, and the movie title may be removed from the queues of both users.

FIG. 1 shows a sample welcome page with a message 102 that may be presented by the system to a subscriber/user in this first embodiment. In this example, the message is displayed in response to detecting that the user, Misty, shares a shipping address with another registered user, Ross. The message in this example includes a link for accessing a setup page, shown in FIG. 2, for Misty to associate her rental queue with Ross's rental queue, such that Ross becomes a "rental queue buddy" of Misty. The system may, in some embodiments, present the message 102 to Misty only if Ross has granted an appropriate permission.

Figure 2:
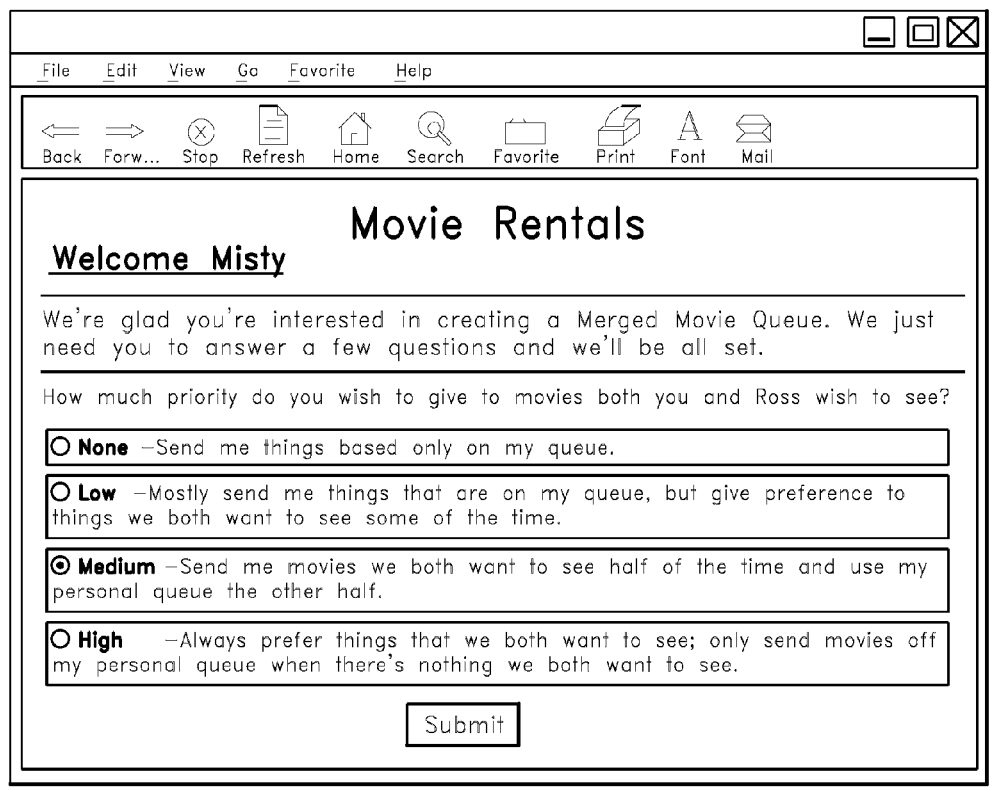
FIG. 2 illustrates an example web page for specifying merged queue settings in the rental queue embodiment of FIG. 1.

Setup pages of the type shown in FIG. 2 may also be accessible via other channels, including channels that do not require the two users to share a shipping address. For example, Misty may conduct a people search to locate Ross, and then select an option to add Ross as a rental queue buddy. The system may limit the number of rental queue buddies each user can have to one, two, three, or some other number.

With reference to FIG. 2, the setup page in this example prompts Misty to specify a priority setting, referred to as a "merge level," to be given to the rental queue of her new rental queue buddy, Ross. From this page, Misty may select an option which gives a high priority to items shared by both rental queues, such that shared items are checked out/sent to Misty first before non-shared items. Alternatively, Misty may give a medium or low priority to shared rental items, such that shared rental items are checked out either approximately half of the time, or less than half of the time compared to non-shared items, respectively. Finally, Misty may give no priority to shared items, such that the system sends out the items based solely on Misty's queue. It should be understood that the setup options shown in FIG. 2 are merely illustrative, and that numerous alternatives are possible, including alternatives in which no user setup steps are required. Preferably, the rental queue affiliations are directional, meaning that if user A adds user B as a rental queue buddy, user A does not automatically become user B's rental queue buddy.

Figure 3:
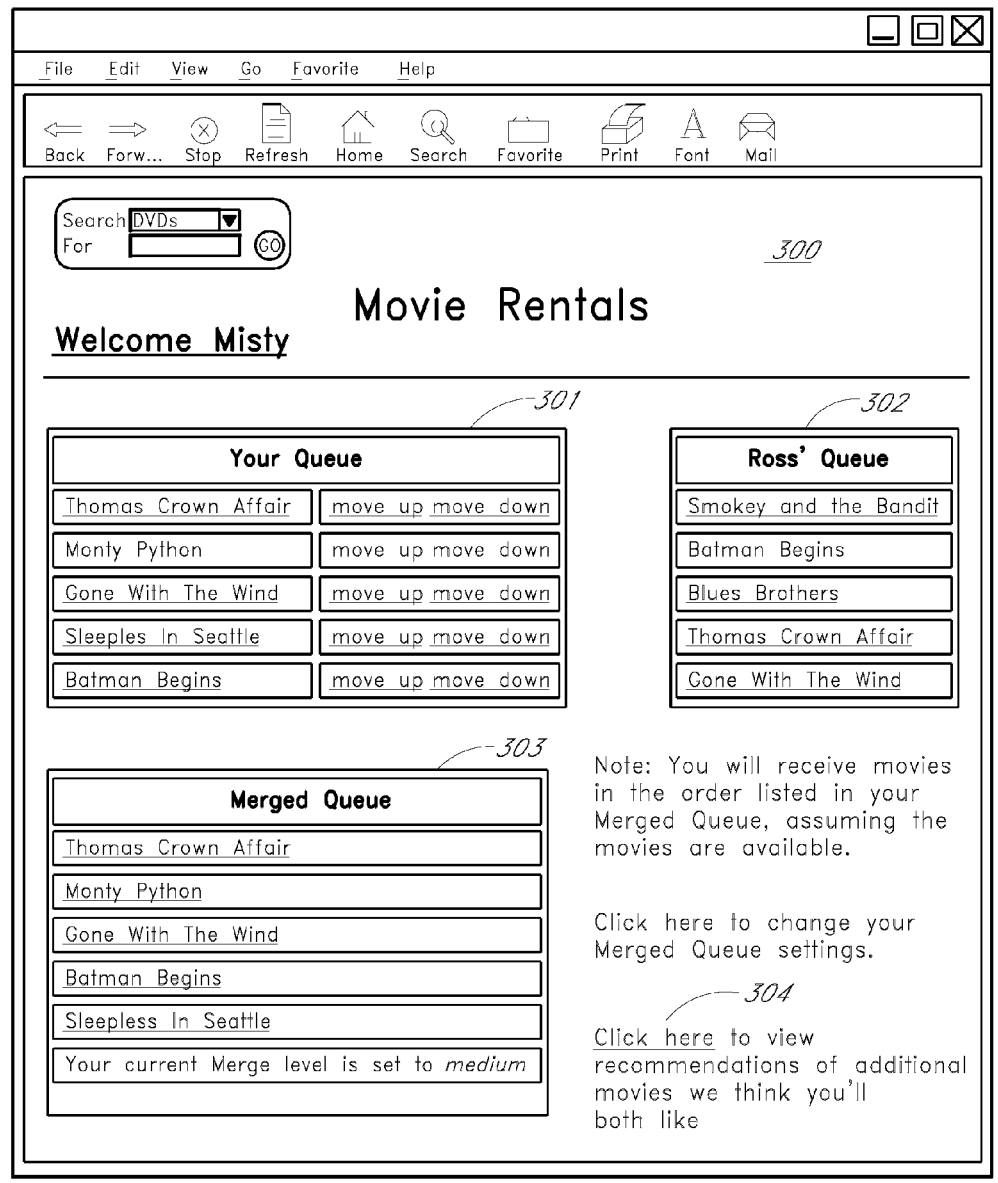
FIG. 3 illustrates example content, including a merged queue, of a rental queue page in the embodiment of FIG. 1.

FIG. 3 shows a sample rental queue page 300 for Misty after she has added Ross as a rental queue buddy. The page shows Misty's queue 301, Ross' queue 302, and a "merged queue" 303. Users of the system may populate their respective rental queues, such as queues 301 and 302, by browsing and selecting items from the electronic catalog of movie/video titles, as is known in the art. Each rental queue may be represented in computer storage as an ordered list of item identifiers, with this list being associated with a particular user account. (Other types of preferences lists, such as wish lists and suggestion lists, may be represented in the same manner.) An item represented in this list is said to be "in" the associated rental queue.

The merged queue 303 in this example is a re-ordered version of Misty's queue, with the items re-ordered to take into consideration the preferences of Ross. In this example, because the move title "Batman Begins" appears on Ross' queue, it has been moved up to a higher position than "Sleepless in Seattle," which does not. The merged queue 103 represents the order in which the items appearing in Misty's queue 301 will actually be sent to Misty, assuming item availability and that the queues 301, 302 of Misty and Ross do not change prior to shipment. The particular ordering of items in the merged queue in this embodiment also depends upon the merge level selected in FIG. 2, which is "medium" in this example. If Misty's merge level were set to "high," the two movies that appear only in Misty's queue and not Ross' (namely "Monty Python" and "Sleepless in Seattle") would appear at the bottom of the merged queue 303, and thus would be delivered last. While viewing the rental queue page 300, Misty can move items up and down in her queue 301 via the "move up" and "move down" controls to, in some cases, cause the merged queue 303 to be updated.

The web page shown in FIG. 3 also includes a link 304 that can be selected by Misty to view a list of additional movie titles, or "joint recommendations," that correspond to the collective preferences of her and Ross. (The list of additional movie titles may alternatively be displayed in place of this link 304.) Selection of the link 304 causes the system to invoke a recommendation engine 1612 (shown in FIG. 16, discussed below), which may be implemented as described in U.S. Pat. Nos. 6,266,649 and 6,853,982, the disclosures of which are hereby incorporated by reference. In one embodiment, the joint recommendations are generated by combining the two rental queues 301, 302 to form a combined list of movie titles (with movie titles common to both queues preferably weighted more heavily than others), and passing this list of weighted items to the recommendations engine; the recommendations engine then generates a list of additional items that are collectively similar/related to the combined list but are not included in either rental queue. The rental histories, purchase histories, and/or movie rating profiles of the two users may also optionally be taken into consideration. For instance, if the recommendations engine returns a movie title that has already been rented, purchased or rated by one of the two users, this movie title may be filtered out, or lowered in rank, before the list is displayed. Additional details of how joint or group recommendations may be generated in various contexts are provided in the subsequent subsections.

Figure 4:
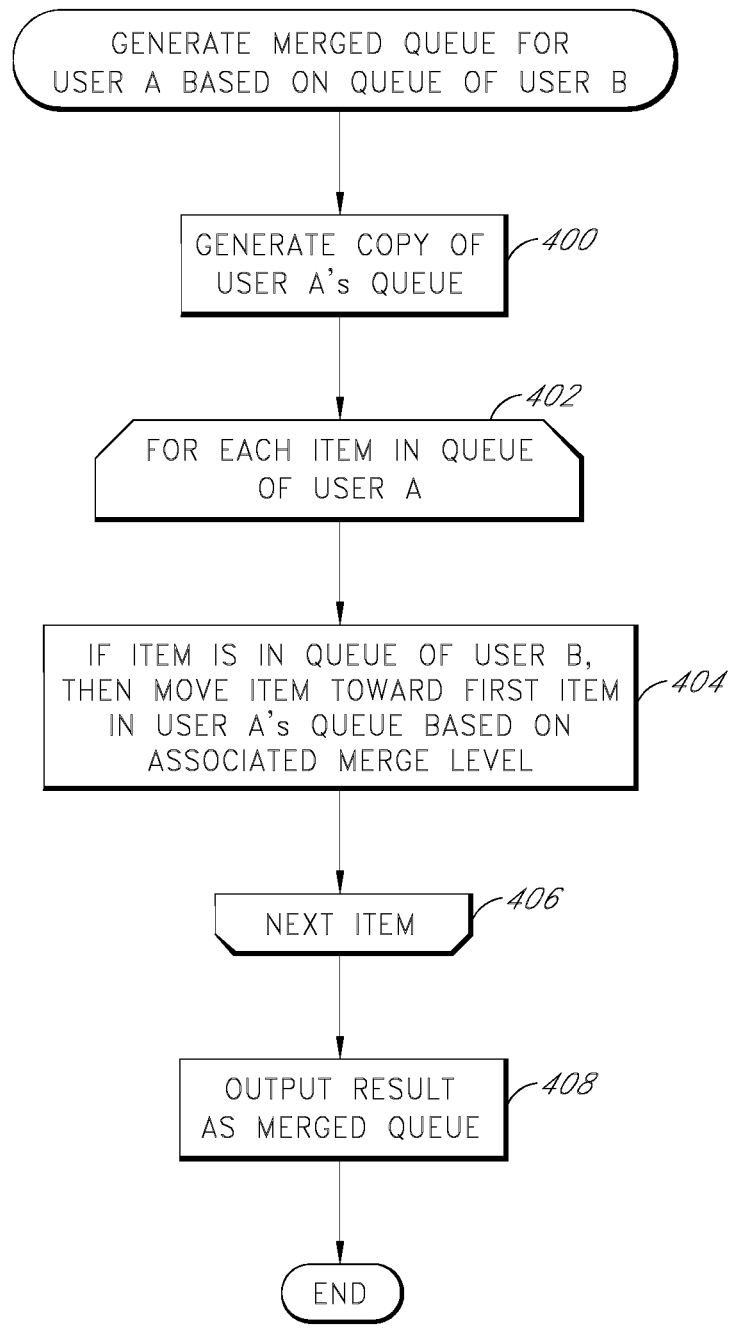
FIG. 4 illustrates a process for generating a merged queue in the embodiment of FIG. 1.

FIG. 4 illustrates one example of a process that may be used by the system to generate the merged queue for a particular user, "user A," given the rental queue of another user, "user B." This process may be executed automatically whenever user A requests a web page that displays the merged queue 303, and whenever the system detects that a new item is to be selected for delivery/rental to user A. In step 400, a copy is made of user A's queue 301 to create an initial version of the merged queue. In steps 402-406, the system then steps through each item in user A's queue, determines whether this item is listed in user B's queue, and if it is, moves the item up in the copy of user A's queue. The amount by which the item is moved up in this example depends on the associated merge level specified by user A for user B. If user A has any additional rental queue buddies, steps 402-406 may be repeated for each such rental queue buddy (not shown in FIG. 4). As depicted in block 408, the result is then output as user A's merged queue.

Various other criteria may also be taken into consideration in generating the merged queue. As one example, user B's rental history may be taken into consideration. For instance, if an item is listed in user A's queue but not user B's, and this item has previously been rented/delivered to user B, this item may be moved down in user A's queue to give it lower priority. To implement this feature, the system may maintain item rental histories of all registered users.

As another example, for each item appearing in user A's queue which is not in user B's queue or rental history, a recommendations algorithm, such as a collaborative filtering algorithm, may be used to generate a score that represents the likelihood that user B will like the item. Each such score may then be used to determine where this item should be positioned in user A's merged queue. For instance, if user B is predicted to have a strong (or weak) affinity for an item in user A's queue, this item may be moved up (or down) in block 404 of FIG. 4, even though it does not appear in user B's queue 102. The recommendations algorithm may, for example, take user B's rental history into consideration, and if user B has taken the time to rate particular items, user B's item ratings profile. Examples of particular recommendations systems and algorithms that may be used for this purpose are described in U.S. Pat. Nos. 6,266,649 and 6,853,982, referenced above.

As another example of additional criteria that may be considered, the system may permit user A to specify which, if any, of the items in user A's queue 301 are to be shared with user B. If an item is not designated for sharing, it may be skipped in blocks 402-406 of FIG. 4. User B's sharing designations may similarly be considered for purposes of generating the merged queue for user A.

Figure 5:
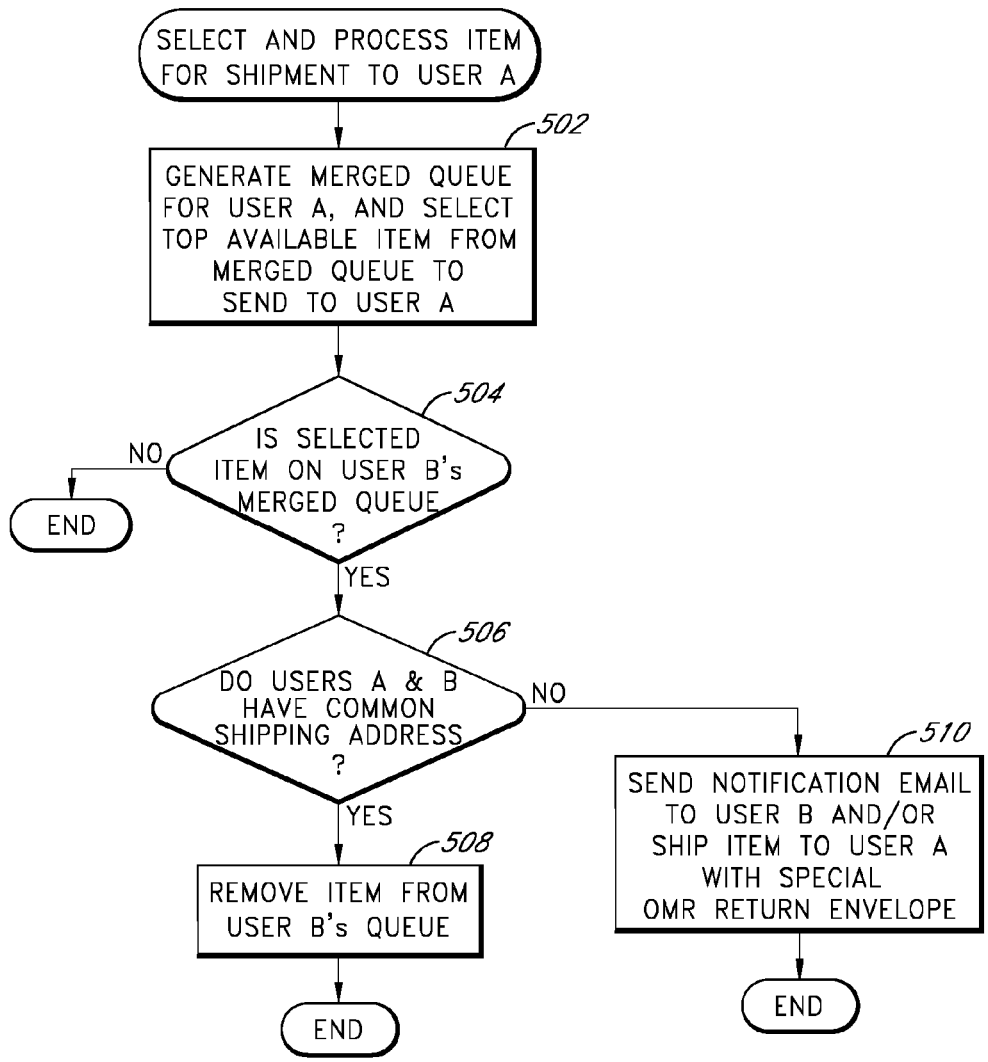
FIG. 5 illustrates a process for selecting an item for shipment, and for performing associated processing, in the embodiment of FIG. 1.

FIG. 5 illustrates one example of a process that may be used by the system to select and process items for shipment for a first user, user A, who has created a rental queue association with a second user, user B. This process may be executed whenever the movie/video rental entity receives a DVD back from user A, and whenever any other type of event occurs that causes a new item to become due to user A (e.g., the start of a new monthly cycle). In step 502, the merged queue for user A is generated (using the process of FIG. 4, for example), and the top available item is selected from this merged queue for shipment/rental to user A. In step 504 the process determines whether this item is on user B's rental queue, and terminates if it is not. If the item is on user B's queue, the process then determines whether user's A and B share a shipping address, and removes the item from user B's queue if they do (steps 506 and 508). The determination of whether to remove the item from user B's queue in this scenario may alternatively be based on configuration settings specified by user B.

As depicted by block 510, if the item is on both queues and the users do not share a shipping address, an email may be sent to user B notifying user B that the item has been shipped to user A. (The transmission of such an email may be contingent upon user A granting an appropriate permission.) This email may include a link, button, or other control that is selectable by the recipient to cause the item to be removed from user B's queue.

Additionally or alternatively, the system selects an option that causes the item to be shipped to user A with a special return envelope that includes an optical mark recognition (OMR) character or region, such as a bubble, that can be filled in to cause the system to remove the item from user B's rental queue. This OMR character or region may be displayed together with an appropriate generic or customized message such as "I watched this movie with my rental queue buddy," or "I watched this movie with Ross." If user A has multiple rental queue buddies, a separate bubble and message may be printed on the return envelope for each. Rather than using fill-in characters, user A may be provided with a special sticker or label, such as a bar code label, that may be affixed to the return envelope to indicate that the movie title was watched with, and should be removed from the rental queue of, a particular rental queue buddy. In either case, the rental entity may scan-in the return envelope upon receipt from user A to cause user B's rental queue to be automatically updated.

To facilitate submissions of ratings, the return envelope may also include OMR bubbles or regions that can be filled in to indicate each user's rating of the movie/video title, such as on a scale of 1 to 5. Bar code labels may alternatively be provided to the user for this purpose. If the OMR marks or labels are used, the associated ratings information may be scanned into the system and added to ratings profiles of the corresponding user or users. This feature may be implemented independently of the other features described herein.

If user A has multiple rental queue buddies, steps 504-510 may be repeated for each such rental queue buddy.

III. Book Club Embodiment (FIGS. 6, 7, 14 and 15)

A second embodiment will now be described with reference to FIGS. 6, 7, 14 and 15. In this second embodiment, members of a club, which in this particular example is a book club, use the online system to create preference lists, referred to as suggestion lists, of the book titles they would like the club to read. These suggestions lists are used in combination by the system—optionally together with other information about member preferences—to select specific book titles for the club members to read. The system may also automate or partially automate the process of sending physical or electronic copies of the book titles to the members of the group according to a specified time schedule. As will be recognized, this second embodiment is also applicable to other types of user groups, clubs and items.

Figure 6:
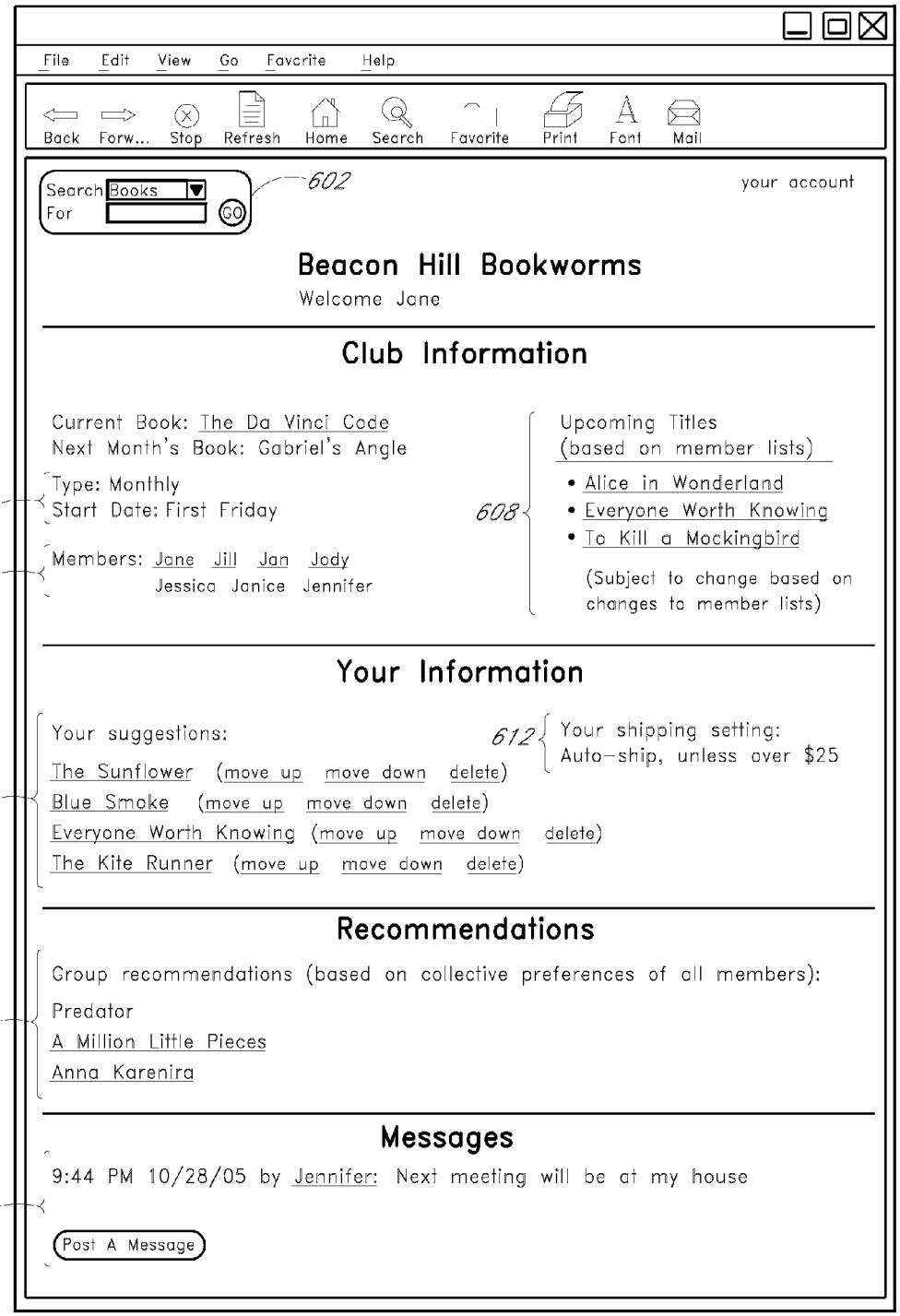
FIG. 6 illustrates a book club page for a hypothetical book club according to a second embodiment of the invention.

FIG. 6 illustrates a sample book club page for a hypothetical book club, the Beacon Hill Bookworms, as personalized for one of its members. The page shows the current book being read by the group, *The Da Vinci Code*, and the next book to be read, *Gabriel's Angel*. The page also includes the following components: (1) a search box 602 for conducting searches of the electronic catalog, (2) information 604 about the book club's book rotation schedule, (3) a list 606 of the club's members, (4) an "upcoming titles" list 608, which is based on the member suggestion lists and which identifies book titles that will be selected in subsequent cycles if member preferences do not change, (5) the current user's suggestion list 610, which in this example includes four book titles selected to suggest to the group, (6) the current user's settings 612 for controlling auto-shipments/sales of the selected books to her, (7) a "group recommendations" list 616 suggesting book titles based on the collective preferences of the group members, as discussed below, and (8) a messages section 614 which displays messages posted to the group by members. Other pages of the online system may provide functionality for users to locate and view information about existing book clubs, join specific book clubs, set up new book clubs, and specify various types of account information and preferences.

As with the rental queue embodiment of FIGS. 1-5, users may populate their respective suggestion lists 610 while browsing the electronic catalog. For example, a user may select a link or button labeled "add to Beacon Hill Bookworms club suggestion list" on a book's detail page in the electronic catalog. Such links or buttons may be displayed automatically on all book detail pages once the user joins the book club. The system may limit the size of the suggestion lists 610 to some maximum number of book titles, such as ten.

Figure 7:
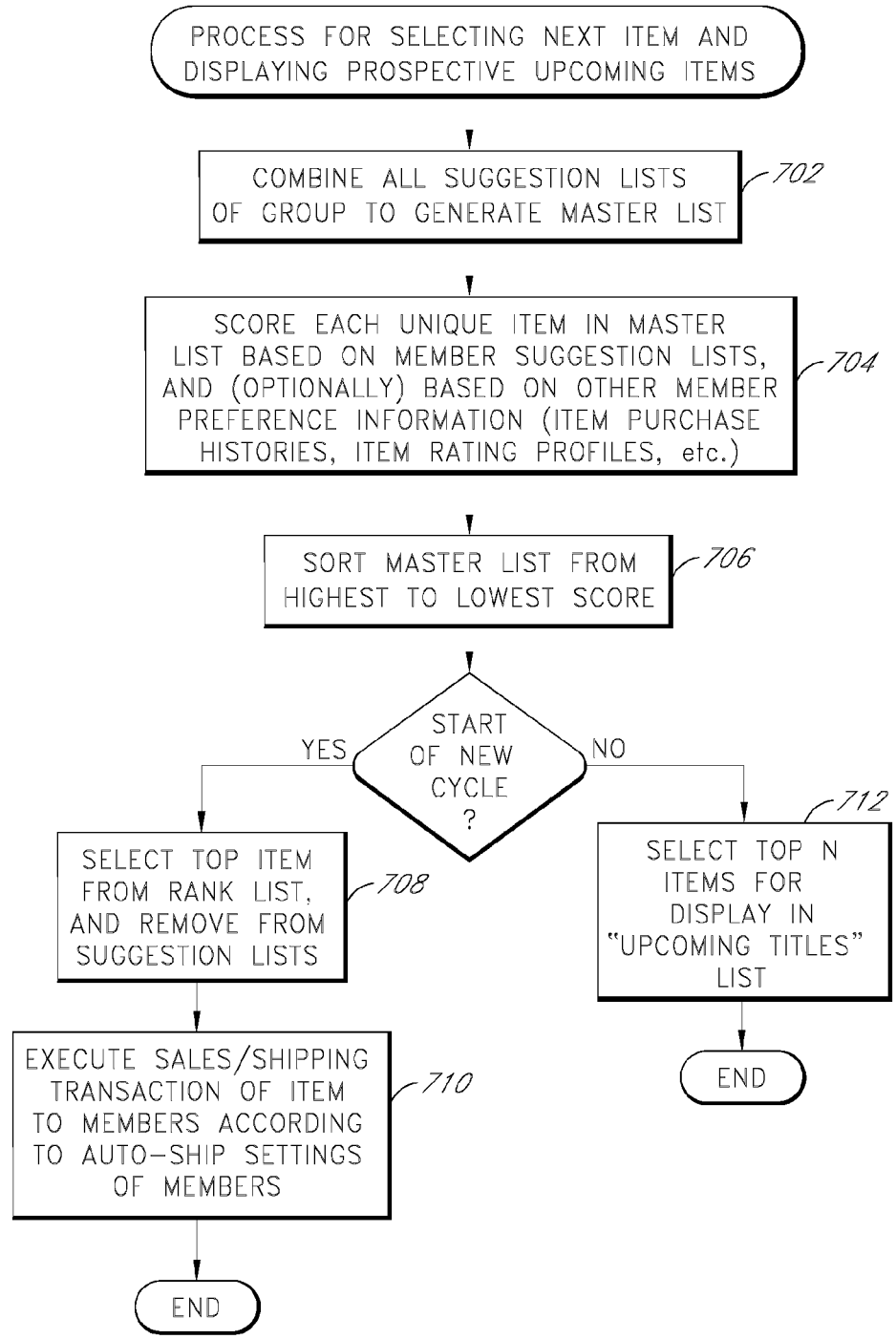
FIG. 7 illustrates one example of a process that may be used in the embodiment of FIG. 6 to select particular books for the club to read, and to generate an "upcoming titles" list as shown in FIG. 6.

FIG. 7 illustrates one example of a process that may be used to select particular books for the club to read, and to generate an "upcoming titles" list 608 as shown in FIG. 6. This process may be executed dynamically each time the list is accessed when, for example, a user accesses a web page that displays the club's upcoming titles list. Additionally, the process may be initiated periodically, such as at the beginning of a new reading cycle for purposes of selecting a next book. In step 702, the process combines all of the suggestion lists of the club members to form a master list.

In step 704, a score is generated for each book title in the master list, regardless of the number of suggestion lists on which this book title appears. At a minimum, this score is preferably generated based on the content of the members' suggestion lists, which represent votes for particular items. For instance, the score of each book title may be incremented for each occurrence of the item in a suggestion list, with the increment amount optionally being dependent upon the position of the item in the suggestion list.

The algorithm used to generate the item scores in step 704 may also take into consideration extrinsic information about the preferences of the members (i.e., information other than the suggestion lists themselves). For example, for each item (book title) in the master list, a recommendation algorithm may be executed to generate an aggregate affinity value that represents the aggregate affinity the group has for the item. The aggregate affinity value may be generated based on the purchase histories, item rating profiles, and/or suggestion lists of the members using methods similar to those described in U.S. Pat. Nos. 6,266,649 and 6,853,982, referenced above. The algorithm used to generate the aggregate affinity values may seek to achieve the following objectives: (1) select book titles that are similar to book titles that members of the group have purchased, rated favorably, or suggested, and (2) exclude book titles that have already been read by members of the group, as evidenced by the purchase histories and/or item rating profiles of the members. To generate the score for an item, the item's aggregate affinity value may, for example, be added to a normalized member-vote-based value derived solely from the suggestion lists.

Various other types of extrinsic information about the item preferences of the members may additionally or alternatively be used to generate the scores, including, for example, the item rental histories and item viewing histories of users. In some embodiments, the system may use extrinsic information to generate the item scores only if a particular condition is met. For example, extrinsic information may be used only if no single book title is included on more than one suggestion list, or only if the scores otherwise result in a tie condition.

In step 706, the items are sorted from highest to lowest score. If the process was triggered by the start of a new monthly or other cycle, the top ranked item is selected as the club's next book title and is removed from the suggestion list(s) on which it appears (step 708). In addition, for members with appropriate auto-shipment settings, the selected item is automatically sold and shipped to the members (step 710). (In some embodiments, the book titles may alternatively be delivered to users electronically over a network.) If, on the other hand, the process was triggered by a page viewing event, the top N items on the ranked master list are selected for display in the upcoming titles list, where N is a selected integer such as three.

As will be recognized, this second embodiment is also applicable to other types of items that can be periodically acquired and reviewed by members of a club, such as movie titles, video game titles, and bottles of wine.

With references again to FIG. 6, the group recommendations 616 may be generated as generally described above for rental queues. Specifically, the suggestion lists of all members of the club may be combined to form a combined list, with each book title weighted in proportion to the number of suggestion lists on which it appears. The combined list of weighted items may then be passed to the recommendations engine (FIG. 16) to obtain a list of additional/recommended items 616 that do not appear on any of the suggestion lists. The book purchase histories and/or book rating profiles of the users may also be taken into consideration; for instance, book titles already purchased or rated by one or more members may be filtered out or lowered in display rank.

Figure 14:
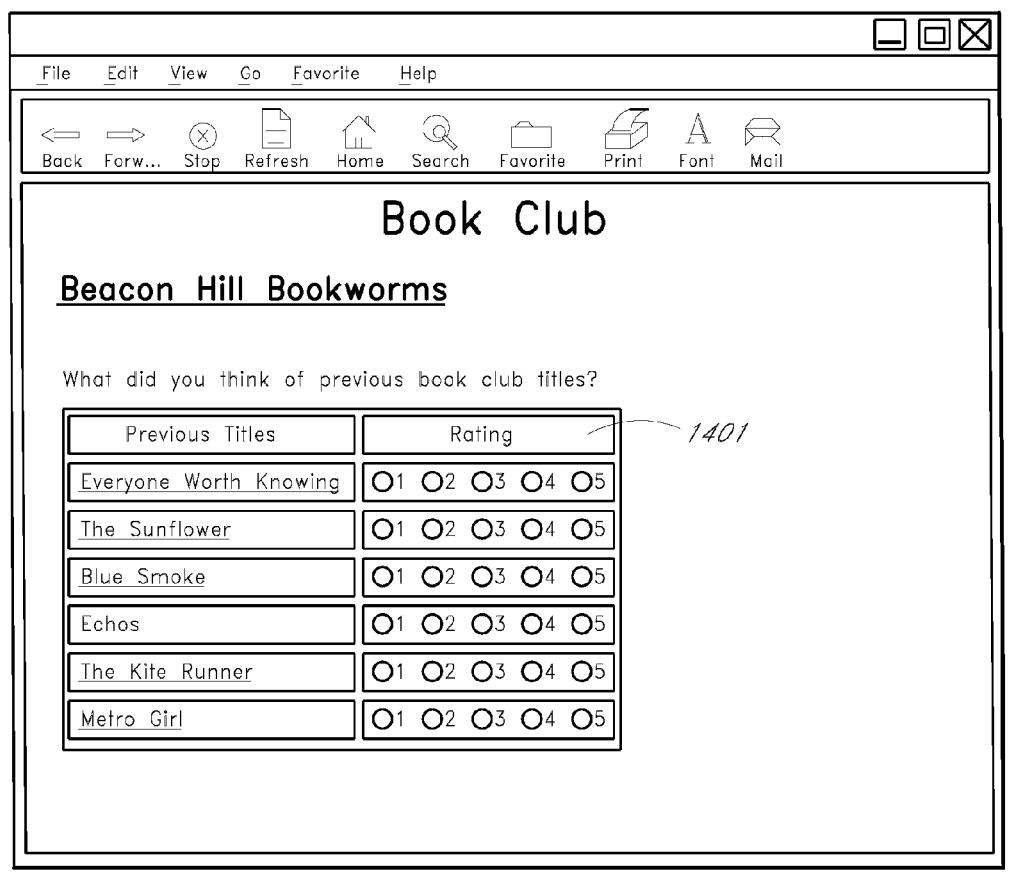
FIG. 14 shows a ratings page that may be presented to club members in a book club embodiment.

FIG. 14 shows a ratings page which may be presented to each book club member to allow the members to rate books the group has previously read. The sample rating scale shown in FIG. 14 uses a 1-5 rating scale 1401, although other rating systems can be used. The club members may additionally or alternatively be prompted to rate the book titles on an ongoing basis, such as once per cycle. The book ratings collected over time from the club members may be passed to the recommendations engine as an additional source of preference information used to generate the group recommendations.

Figure 15:
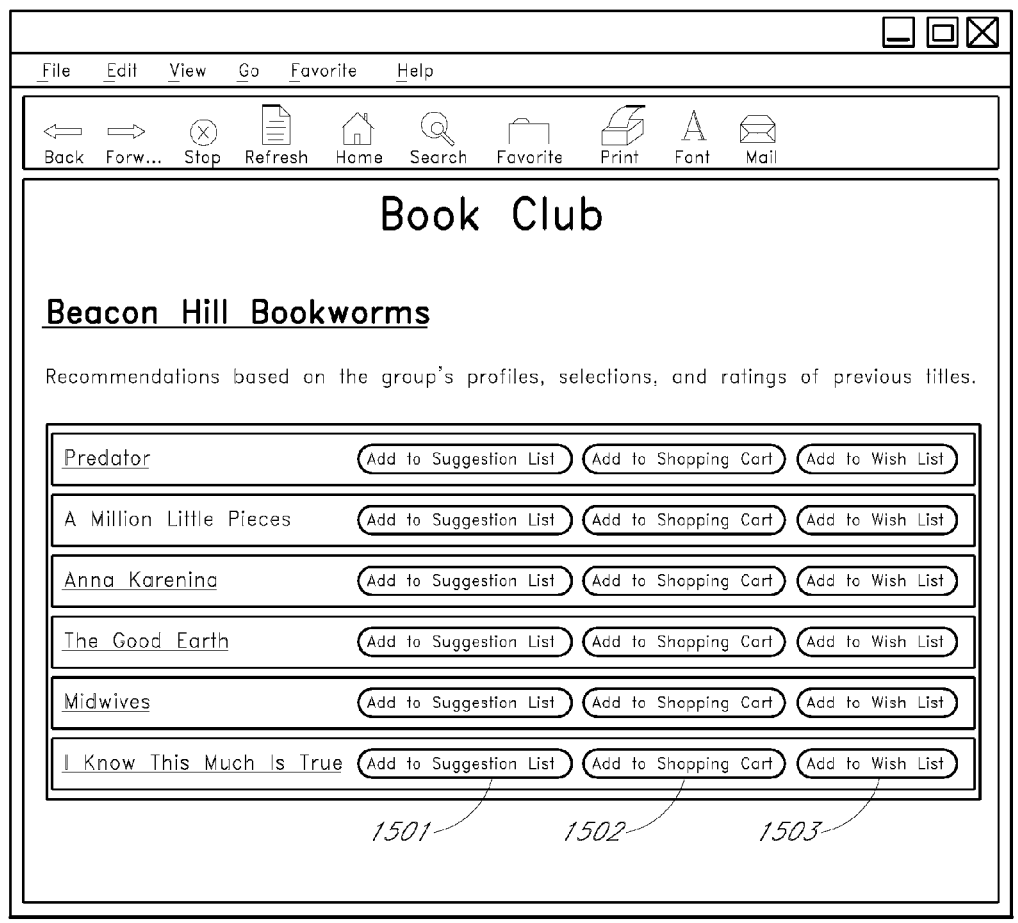
FIG. 15 shows a sample group/club recommendations page for the book club embodiment of FIG. 14.

FIG. 15 illustrates another example of how the system may display the group recommendations to each club member. In this particular example, the recommendations page includes buttons 1501-1503 for enabling the particular member who is viewing the recommendations to add a recommended book title to his or her suggestion list, shopping cart, or wish list. Controls for rating or indicating ownership of the recommended book titles may additionally or alternatively be displayed.

IV. Wish List/Gift Registry Embodiment (FIGS. 8-11)

A third embodiment and application of the invention will now be described with reference to FIGS. 8-10. This third embodiment may be employed in any type of system that provides functionality for users to create wish lists (also referred to as gift registry lists), and for others to locate and make gift purchases from these wish lists. In accordance with this third embodiment, a first user can create a wish list affiliation with a second user, such as a spouse or other family member. Once this affiliation has been established, the system facilitates the ability for others to take the collective preferences of these affiliated users into consideration in selecting a gift for one or both of the users.

Figure 8:
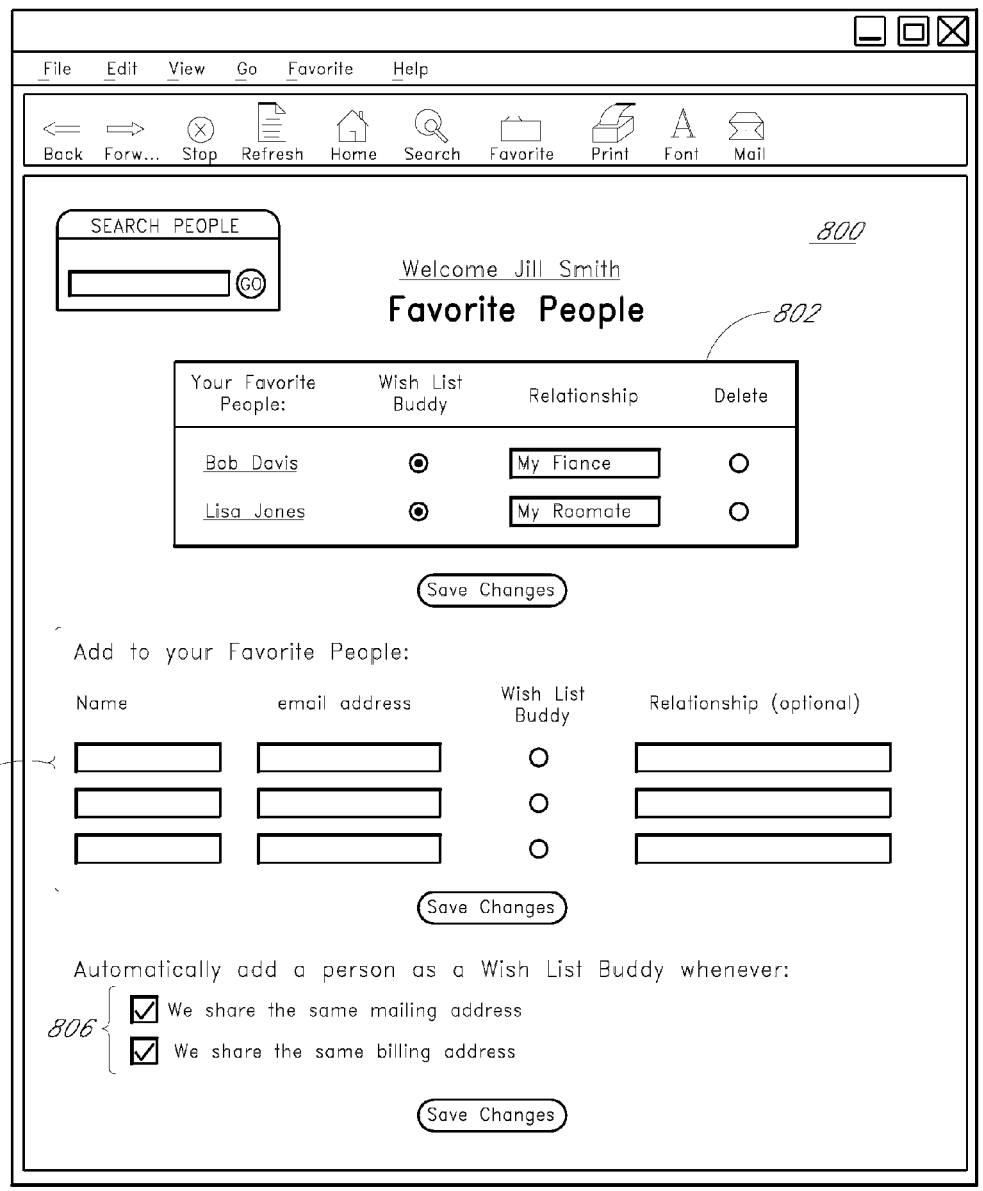
FIG. 8 illustrates a web page that provides functionality for users to create wish list affiliations according to a third embodiment of the invention.

As illustrated in FIG. 8, a user in this embodiment may browse or navigate to a personalized affiliation setup page 800 that provides functionality for creating and managing affiliations, including wish list affiliations, with other users. The page 800 displays a list 802 of other system users ("favorite people" as shown in this example). Adjacent to the name of each favorite person is a radio button for specifying whether each such person is a "wish list buddy." By selecting this option, the user can establish a wish list affiliation with another user. For each favorite person, the user can also optionally type in or edit a corresponding relationship designation such as "my spouse" or "my sister" (a drop down list of predefined relationship designations may alternatively be provided). The affiliation setup page of FIG. 8 also includes an area 804 for adding additional users. In addition, the page includes check boxes 806 for specifying whether a person should be automatically added as a wish list buddy when that person has the same mailing or billing address. Selection of a "save changes" button causes the settings to be recorded by the system within the user's profile.

The particular user interface and options illustrated in FIG. 8 are merely illustrative, and may be varied widely. Various other methods for creating affiliations may additionally or alternatively be used. For instance, when a first user views the wish list page, or another personal page, of a second user, an option may be presented for the first user to add the second user as a wish list buddy. In addition, the system may, in some embodiments, be implemented such that the wish list affiliations are created automatically without requiring any setup by the users. Further, in systems that allow a single user to have multiple wish lists or identities, an option may be provided to select a specific wish list or identity with which to create the affiliation.

Figure 9:
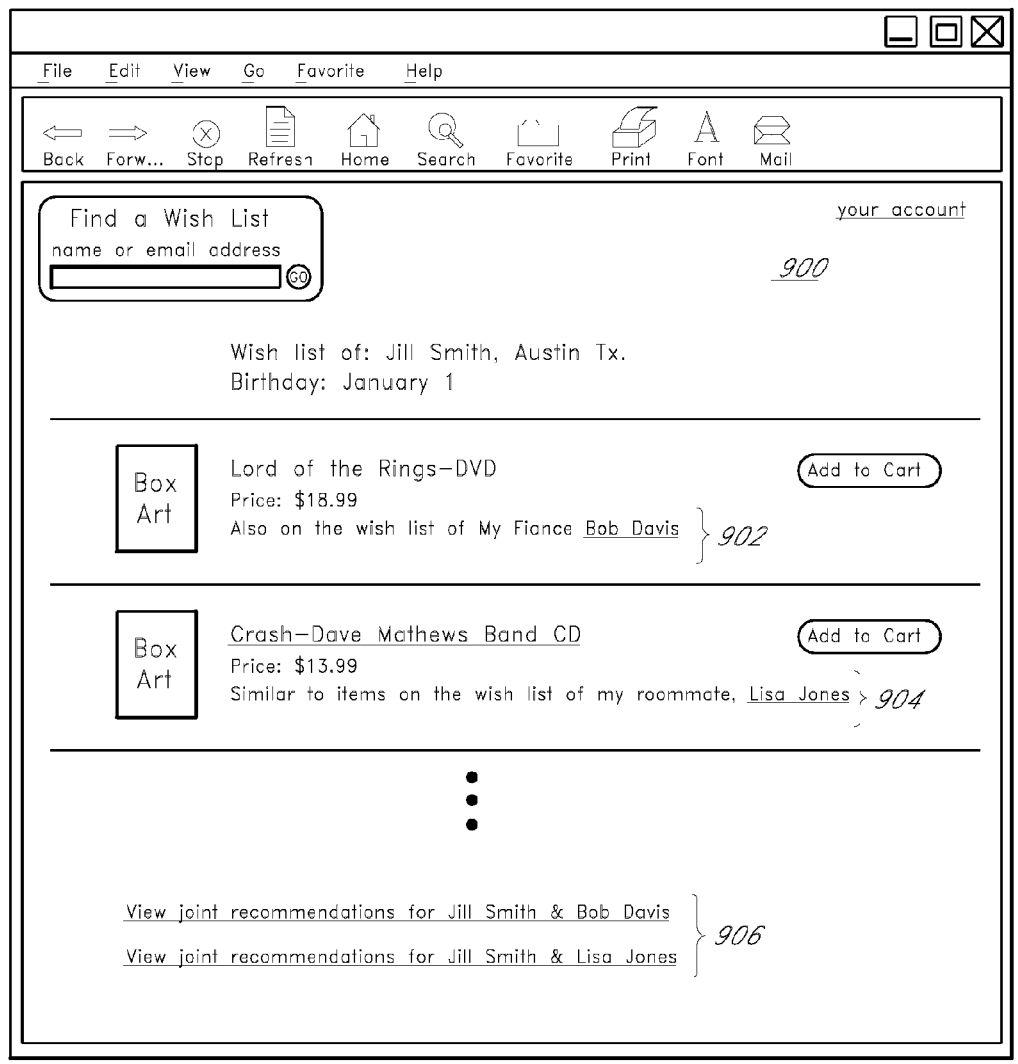
FIG. 9 illustrates a portion of an example wish list page generated in the embodiment of FIG. 8.

As depicted by FIG. 9, when one user views the wish list of another user (the "wish list owner") in this third embodiment, the wish list page 900 is supplemented with notifications 902, 904 identifying any item that is also on, or is similar to items on, the wish list of one or more wish list buddies of the wish list owner. In this example, each such notification displays the name of the wish list buddy, which is selectable to access the wish list buddy's wish list. In addition, if the wish list owner supplied a relationship designation, this relationship designation is included in the notification 902, 904. By providing such notifications, the system facilitates and encourages gift purchases of items that are likely to be enjoyed by both the recipient and a friend, family member, or other individual who is affiliated with the gift recipient. The notification 904 indicating that the item is similar to items on the wish list of the wish list buddy may be suppressed if this item is included in the purchase history or item ratings profile of the wish list buddy.

Figure 16:
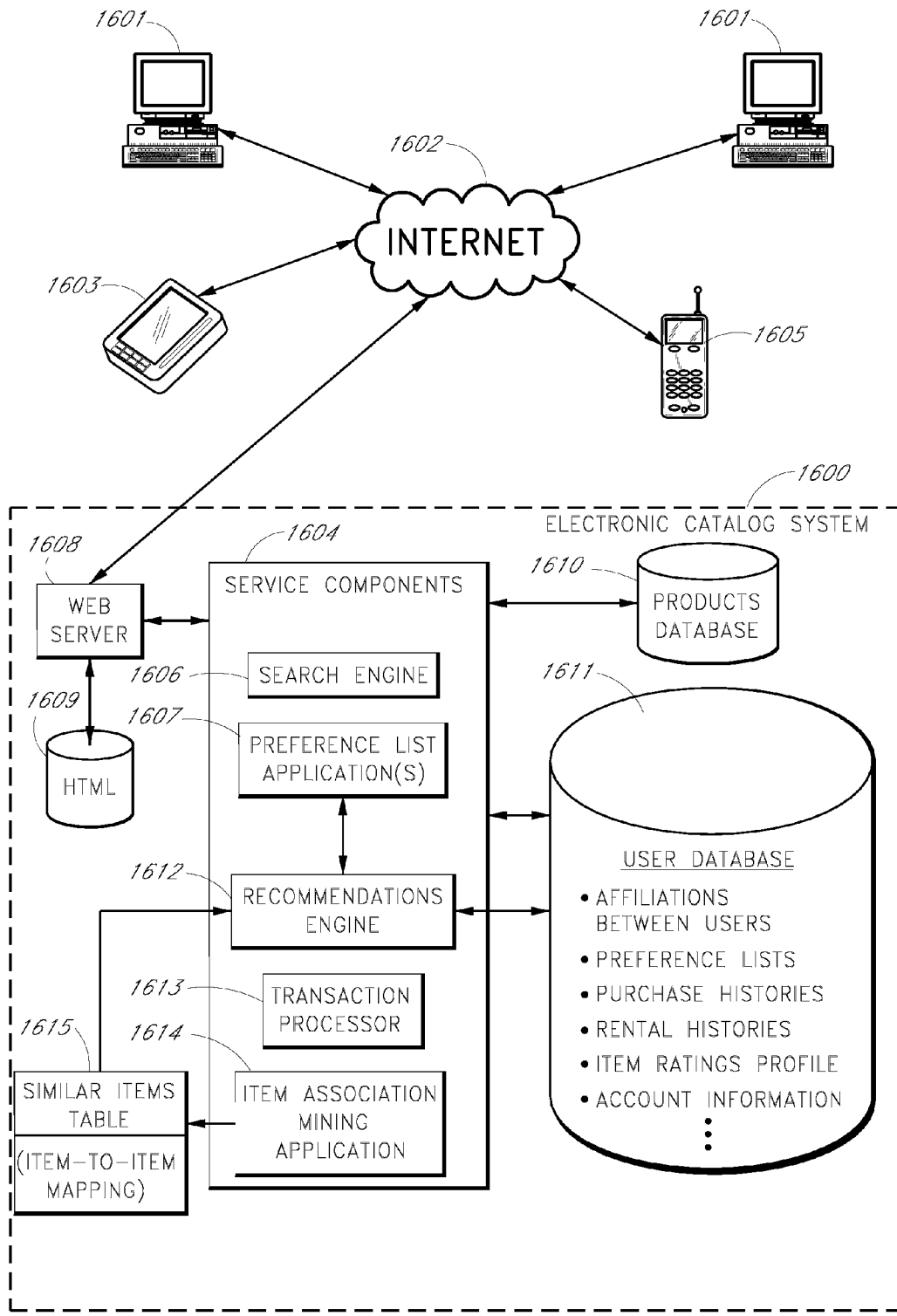
FIG. 16 illustrates an electronic catalog system that includes components for implementing some or all of the features and services depicted in FIGS. 1-15.

As depicted in FIG. 9, the wish list page 900 may also be supplemented with one or more buttons or links 906 for viewing a list of additional items (joint recommendations) that correspond to the collective interests/preferences of the wish list owner and a respective wish list buddy. The lists of additional items may alternatively be displayed in place of these links 906. In this example, two such links 906 are shown, one for each wish list buddy. As discussed below, selection of one of these links 906 in one embodiment causes the displayed wish list, and the wish list of the corresponding wish list buddy, to be combined and passed to a recommendations engine (FIG. 16). The recommendations engine responds by generating and displaying a list of additional catalog items that are collectively similar to, but different from, the items on these two wish lists, preferably excluding items already purchased or rated by either user. For example, selection of the link labeled "view recommendations for Jill Smith+Bob Davis" would cause the system to generate and return a web page listing items that are generally similar to items on the wish lists of these two users (and which are thus based on their collective preferences), but which have not been purchased or rated by either user. The recommendations may be generated as shown in FIG. 11, which is described below.

Figure 10:
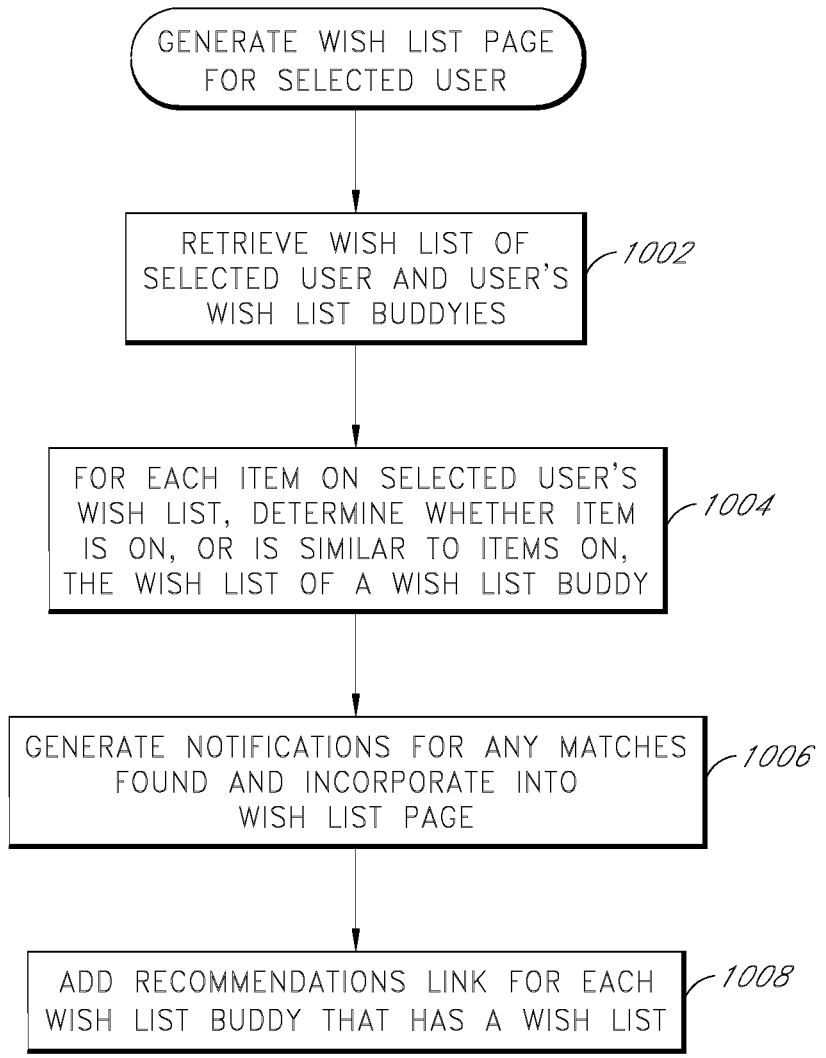
FIG. 10 illustrates an example process for generating a wish list page of the type shown in FIG. 9.

FIG. 10 illustrates a process that may be used to dynamically generate a wish list page of the type shown in FIG. 9. In step 1002, the wish lists of the selected user (i.e., the wish list owner) and of this user's wish list buddies (if any) are retrieved. In step 1004, the process determines whether any item on the wish list of the selected user is also on, or is collectively similar to items on, a wish list of a wish list buddy. The methods described in U.S. Pat. Nos. 6,584,450 and 6,853,982, referenced above, may be used to determine whether an item is collectively similar to the items on a given wish list buddy's wish list. Specifically, the wish list of a wish list buddy may be used as the input set or "items of known interest" to generate a set of recommendations; a determination can then be made whether the subject item is included in this recommendations set. If any matches are found in step 1004, corresponding notification messages are generated and incorporated into the wish list page in step 1006, with "also on" type notifications 902 taking priority over "similar to" notifications 904 for the same item/wish list buddy pair. Preferably, wish list items for which one or more notifications 902, 904 exist are displayed before (i.e., at a higher position in the wish list than) items for which no notifications exists. Finally, in step 1008, a separate recommendations link 906 (FIG. 6) may be added to the page for each of the selected user's wish list buddies who has a wish list.

When a user makes a purchase of an item that is also on the wish list of a wish list buddy of the gift recipient, the system may send an email to the wish list buddy with a notification of the purchase event. This email may include a link for removing the item from the wish list buddy's wish list.

Figure 11:
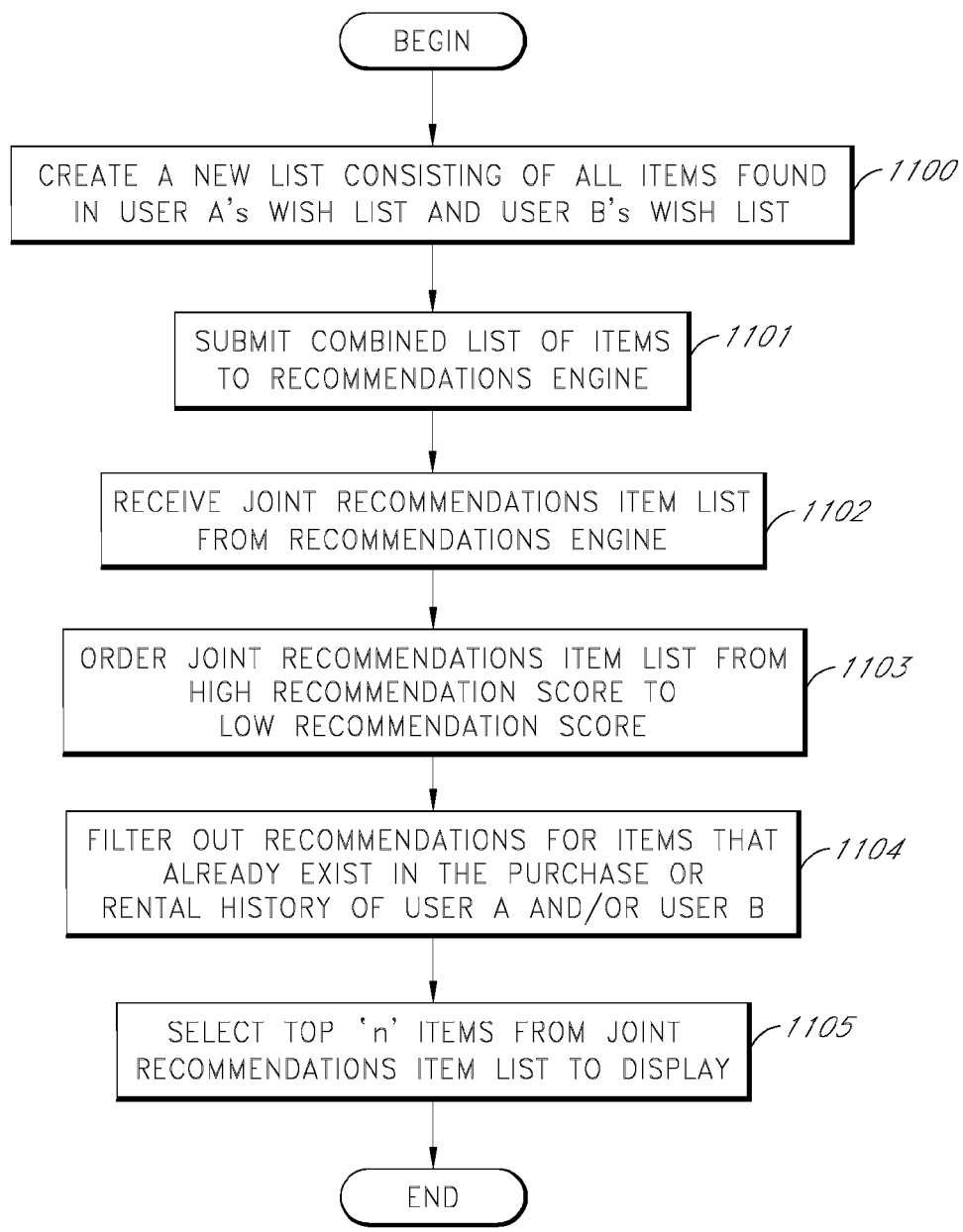
FIG. 11 illustrates a process for generating joint recommendations using wish lists of two associated users.

FIG. 11 illustrates a process that may be used to generate joint recommendations for two associated users, "user A" and "user B." This process may be executed automatically when, for example, a user requests a web page that displays joint recommendations for user A and user B. In step 1100, a combined list is formed that includes all items on user A's wish list and all items on user B's wish list. If any items are common to these two wish lists, these common items are preferably weighted more heavily for purposes of generating the joint recommendations. For instance, an item that is only on one of the two wish lists may be assigned a default weight of one, while an item on both wish lists may be given a weight of five (meaning generally that it will be given five times more weight for purposes of generating the joint recommendations). The items on the combined list may also be weighted based on other factors, such as the amount of time since the item was added to the relevant wish list(s).

The combined list of items, together with item weights (if applicable), is then passed to the recommendations engine 1612 (FIG. 16) in step 1101, which returns a corresponding list of recommended items in step 1102. (See U.S. Pat. No. 6,853,982, referenced above, for examples of algorithms that may be used to generate item recommendations from a list of weighted items.) This output list is referred to as a joint recommendations list, and may include item-specific recommendation scores. In step 1103, the system may order the recommended items from high to low recommendation score, if such scores are provided by the recommendation engine. Then in step 1104, the system may filter out certain recommended items from the list, such as those that already exist in the purchase or rental history of any of the associated users. Finally, in step 1105, the system recommends some or all of the items on the filtered joint recommendations list to the relevant user.

The process shown in FIG. 11 may also be used to generate joint recommendations based on the rental queues of two affiliated users; this may be accomplished by replacing the wish lists in block 1100 with rental queues.

V. Community recommendations (FIGS. 12-13)

A fourth embodiment and application of the invention will now be described with reference to FIGS. 12 and 13. This embodiment may, but need not, be implemented as part of an interactive system that provides functionality for users to create personal rental queues as described above. Briefly, this fourth embodiment provides functionality for a group of users, such as friends or family members, to form a community or user group for purposes of identifying and obtaining movies to watch together.

Figure 12:
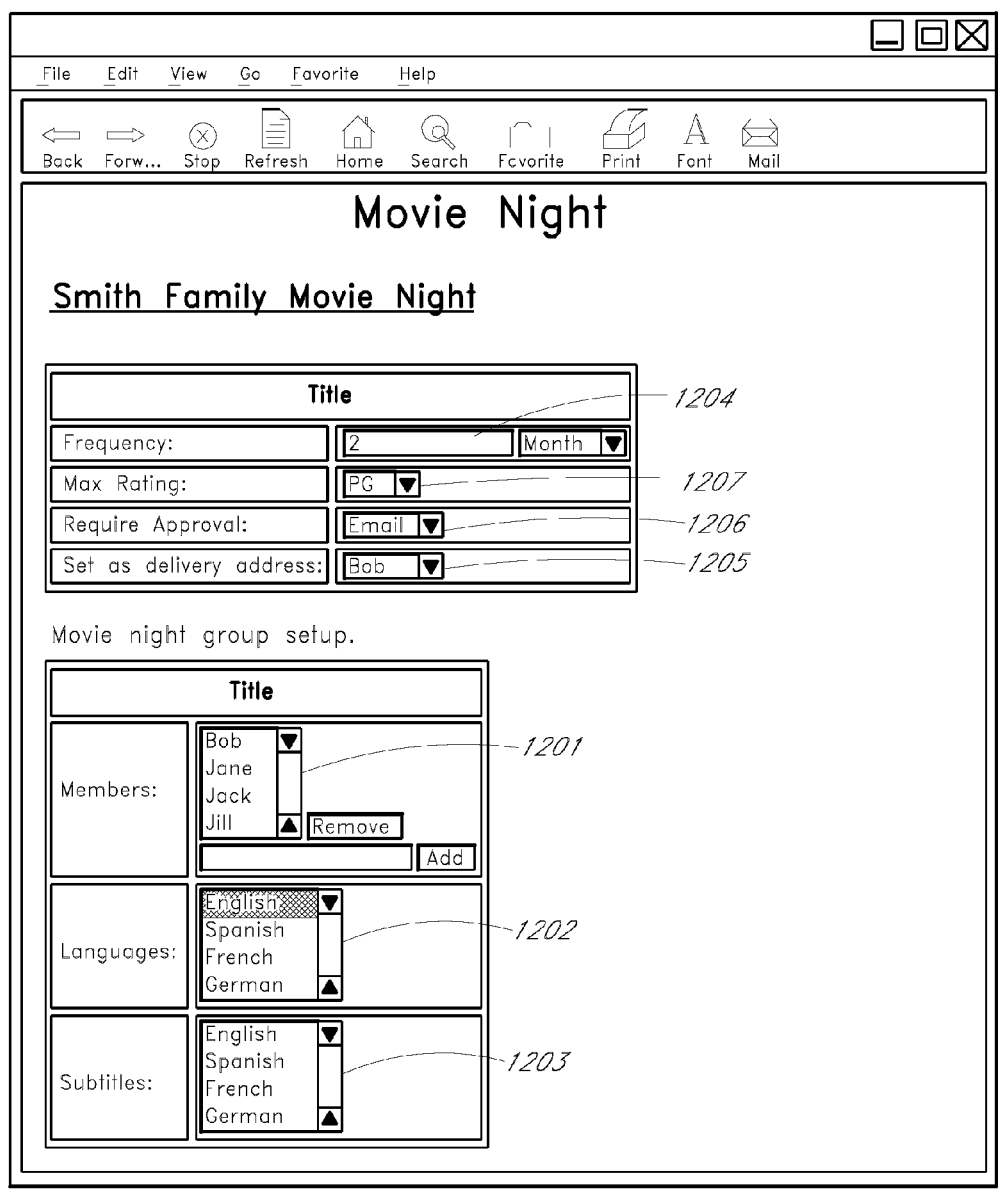
FIG. 12 illustrates a sample setup page of a service that facilitates the sharing of movie titles among users.
Figure 13:
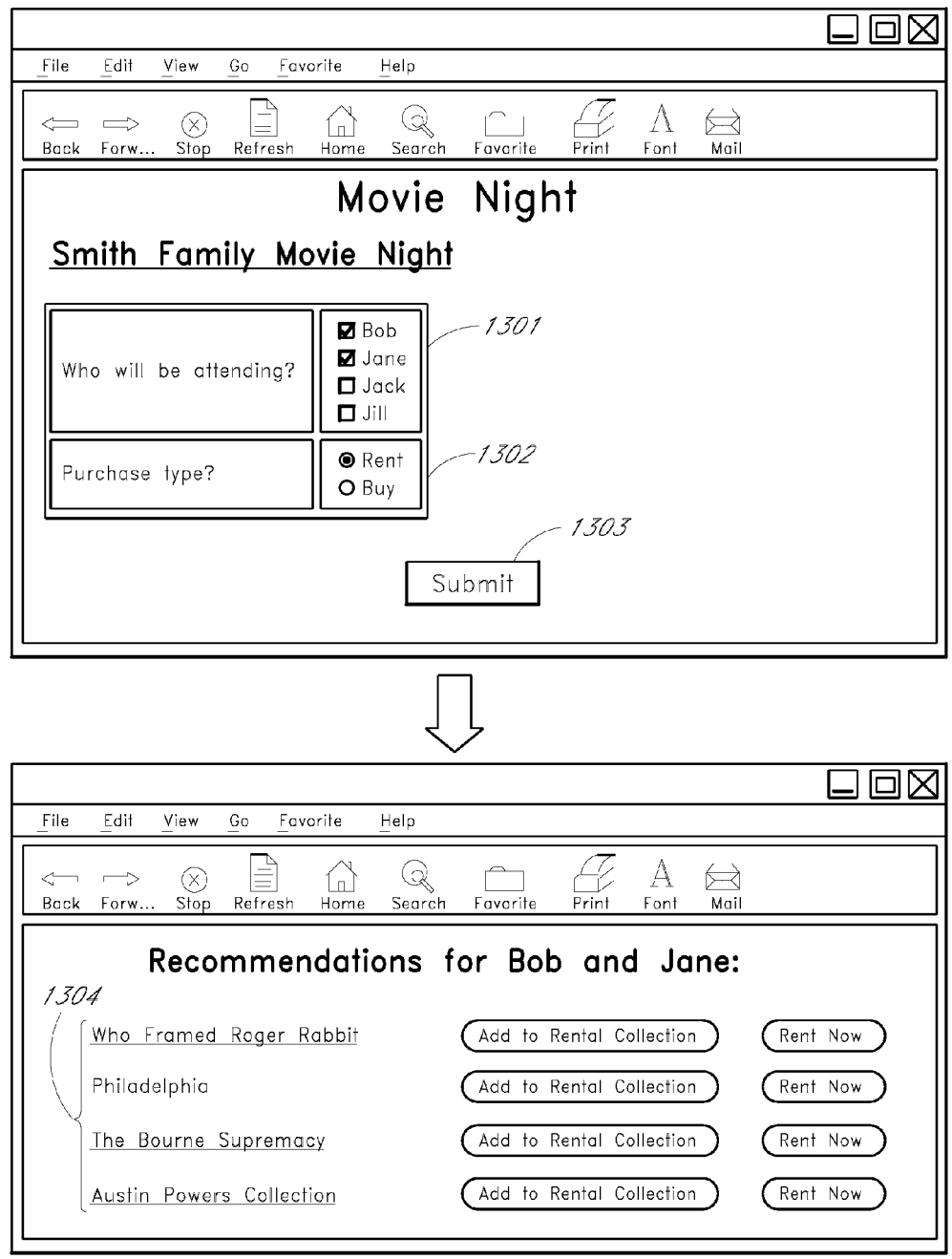
FIG. 13 illustrates a sequence of web pages generated by the service depicted in FIG. 12 to assist a group of users in identifying movie titles that correspond to their collective preferences.

FIG. 12 illustrates a sample setup page that may be presented by the system to specify the members of the group. The setup page in this example is designed to be accessed by one user in the associated group, such as the group leader. The setup page includes a list of the current members of the group 1201, and provides functionality for adding and deleting members. The setup page also includes an option of selecting language preferences for movies 1202 and movie subtitles 1203.

The setup page also includes a field 1204 for specifying the frequency with which movies are to be recommended (and optionally delivered) to the group, and includes a drop down list 1205 for specifying the member to whom the movies are to be delivered. In this example, the group leader has selected to receive a recommendation twice a month and to require approval via email before a recommended movie is sent (field 1206). The "require approval" drop down menu 1206 may also include a "no" option that can be selected to cause the recommended movies to be shipped automatically. The page also includes a drop-down list 1207 for selecting the maximum rating of movies to be recommended to the group by the system. For example, a family group that includes young children may set the maximum rating at 'PG', whereas a group composed of mature adults may set 'R.' as the maximum rating. In embodiments or use cases in which the movies are sold rather than rented to the group, the setup page may also provide an option to designate a maximum price to be paid for a movie.

Once the setup process is complete, the system may use the collective preference data of the group to generate group recommendations at the specified frequency. The collective preference data may, for example, include the movie rental queues, movie rental histories, movie rating profiles, and/or purchase histories of the individual members of the group. The group recommendations may be generated using the methods described above, and using process steps similar to those shown in FIG. 11 The group recommendations may, for example, be emailed to some or all of the members for approval, and/or the top recommended movie titles may automatically be delivered to the designated member. As with the book club embodiment, the system may also prompt each member to rate the movie titles that have been delivered to the group.

FIG. 13 illustrates an additional feature that may be implemented to enable the group members to interactively request group recommendations for all or a designated subset of a group's members. As shown in FIG. 13, the system displays an option to designate which of the group's members will be viewing the movie, so that the recommendations can be tailored specifically to the preferences of these members. In the sample screen shown at the top of FIG. 13, a list of four users/members 1301 is shown from which any subset, including all of the members, may be selected. When the "submit" button 1303 is selected, the system generates and returns a web page with a list of recommended movie titles 1304. The system may generate this list 1304 based primarily or exclusively on the collective preferences (rental queues, rental histories, purchase histories, ratings profiles, etc.) of the designated attendees—in this case Bob and Jane. However, the system may also take into consideration the preference data of the non-attending member(s) of the group; for instance, the system may have a stronger than usual tendency to recommend movie titles that have already been rented, purchased or rated by the non-attendees (Jack and Jill in this example).

In one embodiment, once a rented movie has been returned, the system sends all of the designated attendees an email message prompting them to each rate the movie.

VI. Example System Components (FIG. 16)

FIG. 16 illustrates an electronic catalog system 1600 with a set of components for implementing some or all of the embodiments and features described above. The electronic catalog system 1600 can be accessed remotely via the Internet 1602 from a PC 1601, PDA 1603, cellular phone 1605, or other type of computing device that runs a web browser program. The electronic catalog system 1600 includes a web server 1608 (which may be implemented using any number of physical servers), a database of HTML (hypertext markup language) content 1609, a set of "service components" 1604 (four of which are shown), a products database 1610, a user database 1611 and a similar items table 1615—all of which may be implemented using general purpose computers and associated software. The various components of the web site system 1600 may run, for example, on one or more servers (not shown).

The HTML database 1609 contains, among other things, templates, scripts, and HTML content used to generate item detail pages, search result pages, browse node pages, and other types of pages that may be displayed during the course of a browsing session, including those shown in the figures. The products database 1610 contains data related to the products/items represented in the electronic catalog. This data may, for example, include price, product descriptions, product images, availability information, customer reviews, average customer ratings, and/or other types of product-related information as is known in the art.

The user database 1611 stores information about registered users. The information stored for a given user may include, for example, (1) the user's affiliations with other users and/or groups, (2) the user's preferences list or lists (such as a rental queue, a wish list, and/or one or more suggestion lists), (3) the user's purchase and/or rental history, the user's account information (e.g., shipping address, email address, payment information, settings, etc.), and (4) in embodiments that provide functionality for users to explicitly rate items, the user's item ratings profile. The types of information stored for the users may vary widely depending upon the type(s) of services implemented by the electronic catalog system (retail sales, DVD rentals, user-to-user sales, online book clubs, etc.). In addition, although a single user database is shown for purposes of illustration, the various types of collected user information may be distributed across a number of different databases, and/or may be stored in other types of data repositories (e.g., flat files).

The web server 1608 accesses the service components 1604 in response to page requests from users. The service component 1604 may run on one or more general purpose computers, which may be separate from the web server computer(s). The service components 1604 include, among other things, a search engine 1606, one or more preference list applications 1607 (e.g., a rental queue application, a wish list application, and/or a book club application), a recommendations engine 1612 (which may be implemented as described in U.S. Pat. Nos. 6,266,649 and 6,853,982, mentioned above), a transaction processor 1613 and an item-association mining application 1614. In one embodiment, the search engine 1606 provides users with the ability to search for products in the products database 1610, and to search for other users and/or their preference lists.

Each preference list application 1607 provides functionality for users to create and manage a particular type of preference list, such as a rental queue, a suggestion list, a wish list, or a shopping list, and to create associated affiliations with other users or user groups. In addition, each preference list application 1607 includes functionality, as set forth above, for using the preference lists of affiliated users to enhance and facilitate item selection decisions. As illustrated in FIG. 16 and described above, the preference list application(s) 1607 may use the recommendations engine 1612 to perform certain types of tasks. The preference list application(s) 1607 may be invoked when, for example, a requested web page includes coding for creating an affiliation with another user or for viewing a preference list.

To request recommendations, the web server 1608 sends a request to the recommendations engine 1612, which retrieves a list of one or more items (e.g., product IDs) from the user database 1611, optionally together with associated item ratings and/or weights. The recommendations engine 1612 responds with a list of recommended items. In the illustrated embodiment, the recommendations engine 1612 accesses a Similar Items Table 1615 which contains item-to-item mappings and data values used to generate the recommendations. The item-to-item mappings represented in this table 1615 may reflect purchase-based similarities (e.g., items A and B are similar because a relatively large portion of the users who bought item A also bought item B), rental-based similarities (e.g., items A and B are similar because a relatively large portion of the users who rented item A also rented item B), item viewing based similarities (e.g., items A and B are related because a significant portion of those who viewed item A also viewed item B during the same browsing session), tag-based similarities (e.g., items A and B are similar because a relatively large portion of the users who tagged item A assigned the same tag to item B), content-based similarities, and/or similarities based on other criteria.

The Similar Items Table 1615 is generated or updated offline by the Item-Association Mining Application 1614, which may use the same or similar data analysis methods to those described in U.S. Pat. No. 6,912,505, referenced above. In one embodiment, each similar items list generated by the Item-Association Mining Application 1614 and stored in the Similar Items Table 1615 consists of the N (e.g., 20) items that are deemed to be the most closely related to the key or reference item. Each pair of related items item in the Similar Items Table 1615 is preferably stored together with a commonality index ("CI") value which indicates the degree to which the two items are related.

As will be appreciated, FIG. 16 is merely illustrative of one type of system in which the inventive features may be embodied. In other embodiments, these features may, for example, be implemented in an interactive television system, an online services network, or some other type of interactive system.

VII. Conclusion

All of the features described above may be embodied in, and automated by, software modules executed by general purpose computers. The software modules may be stored in any type of computer storage device or medium. All combinations of the various embodiments and features described herein fall within the scope of the present invention.

Although the various inventive features and services have been described in terms of certain preferred embodiments, other embodiments that are apparent to those of ordinary skill in the art, including embodiments which do not provide all of the benefits and features set forth herein and do not address all of the problems set forth herein, are also within the scope of this invention. For example, although the particular examples described above involve physical products that are shipped to users, the invention may also be used in systems in which the products (book titles, movie titles, etc.) are transmitted to users digitally over a network rather than shipped to the users. The scope of the present invention is defined only by reference to the appended claims.

What is claimed is:

1. A computer-implemented method, comprising:
    maintaining a first queue of a first user in computer storage, said first queue identifying a plurality of items selected by the first user from an electronic catalog of items;
    maintaining a second queue of a second user in computer storage, said second queue identifying a plurality of items selected by the second user from the electronic catalog of items;
    detecting that the first and second users share a common delivery address;
    in response to detecting that the first and second users share a common physical address, generating a user interface having a hyperlink that provides an option to the first user to have the first and second queues used in combination to select items for delivery to the first user, and providing the user interface over a computer network to a computing device of the first user;
    creating an association between the first and second queues at least partly in response to acceptance of the option by the first user;
    reordering the plurality of items specified in the first queue for the first user based, at least in part, on the plurality of items in the second queue, such that the second queue is taken into consideration in re-ordering the plurality of items for the first user, said reordering comprising increasing a ranking of a first item in the first queue, via execution of program code by physical computer system, based on the association between the first and second queues; and
    controlling delivery of the plurality of items to the first user such that the items are delivered in an order that is based on the reordering;
    said method performed by a computer system under control of program instructions.

2. The method of claim 1, further comprising outputting to the first user a re-ordered listing of the plurality items in the first queue, said re-ordered listing reflecting said preferences of the second user, and specifying a delivery order for delivering items to the first user.

3. The method of claim 1, wherein reordering the plurality of items in the first queue comprises increasing the ranking of the first item in the first queue in response to detecting that said first item is also in the second queue.

4. The method of claim 1, wherein the first and second queues are rental queues that identify items selected by the first and second users, respectively, to rent.

5. The method of claim 4, wherein reordering the plurality of items specified in the first rental queue comprises additionally taking into consideration a rental history of the second user.

6. The method of claim 1, wherein reordering the plurality of items in the first queue comprises executing a recommendations process to predict a degree of affinity the second user has for an item that is in the first queue but not in the second queue.

7. The method of claim 1, wherein reordering the plurality of items in the first queue comprises, for an item that is in the first queue but not the second queue, calculating a value that represents a degree to which the item is related to the plurality of items in the second queue.

8. The method of claim 1, wherein the plurality of items specified in the first queue are reordered in accordance with a setting specified by the first user regarding an amount of weight to be given to the second queue.

9. The method of claim 1, further comprising the computer-implemented steps of:
   selecting the first item from the first queue for delivery to the first user, said first item being an item that is also in the second queue; and
   in response to selecting the first item for delivery to the first user, doing one of the following: (a) automatically removing the first item from the second queue, (b) prompting the second user to indicate whether the first item is to be removed from the second queue.

10. The method of claim 1, further comprising selecting the first item from the first queue for delivery to the first user; and causing the first item to be sent to the first user with a return envelope that includes an area for indicating whether the first item should be removed from the second queue.

11. The method of claim 1, wherein the items are physical items that are shipped to users.

12. The method of claim 1, wherein the items are digital items that are delivered to users over a computer network.

13. The method of claim 1, further comprising providing, via the user interface, an option for the user to adjust a setting that controls a level of priority given to the second queue in reordering the plurality of items in the first queue.

14. A computer-implemented method of identifying items that correspond to preferences of a group of users, the method, comprising:
   maintaining a first preference list of a first user in computer storage, said first preference list identifying a plurality of catalog items selected by the first user from an electronic catalog of items, and representing preferences of the first user;
   maintaining a second preference list of a second user in computer storage, said second preference list identifying a second plurality of catalog items selected by the second user from the electronic catalog of items, and representing preferences of the second user;
   detecting that the first and second users share a common delivery address;
   in response to detecting that the first and second users share a common delivery address, providing an option to the first user, via a user interface provided on a network, to request creation of an association between the first and second preferences lists;
   creating an association between the first preference list and the second preference list at least partly in response to the first user selecting the option; and
   programmatically using at least the first preference list and the second preference list, in combination, at least partly as a result of the association created between the first and second preference lists, to select a catalog item that corresponds to the preferences of both the first user and the second user, wherein the programmatic selection of the catalog item is in response to detecting that the catalog item is on the first preference list and is also on the second preference list; and
   causing the selected catalog item to be delivered to the first user before at least one catalog item that is listed on the first preference list but not the second preference list;
   said method performed by a computer system under control of program instructions.

15. The method of claim 14, wherein the first and second preference lists are rental queues of the first and second users, respectively, and the selected catalog item is in the rental queue of the first user, and wherein the method further comprises, in response to the programmatic selection of the catalog item, causing the catalog item to be delivered to the first user before at least one item that is in a higher priority position in the rental queue of the first user.

16. The method of claim 14, further comprising generating, in association with the preference list of the first user, an output message which identifies the selected catalog item as corresponding to the preferences of both users.

17. The method of claim 14, wherein the programmatic selection of the item is executed on a computer system comprising computer hardware.

* * * * *